UNITED STATES PATENT OFFICE.

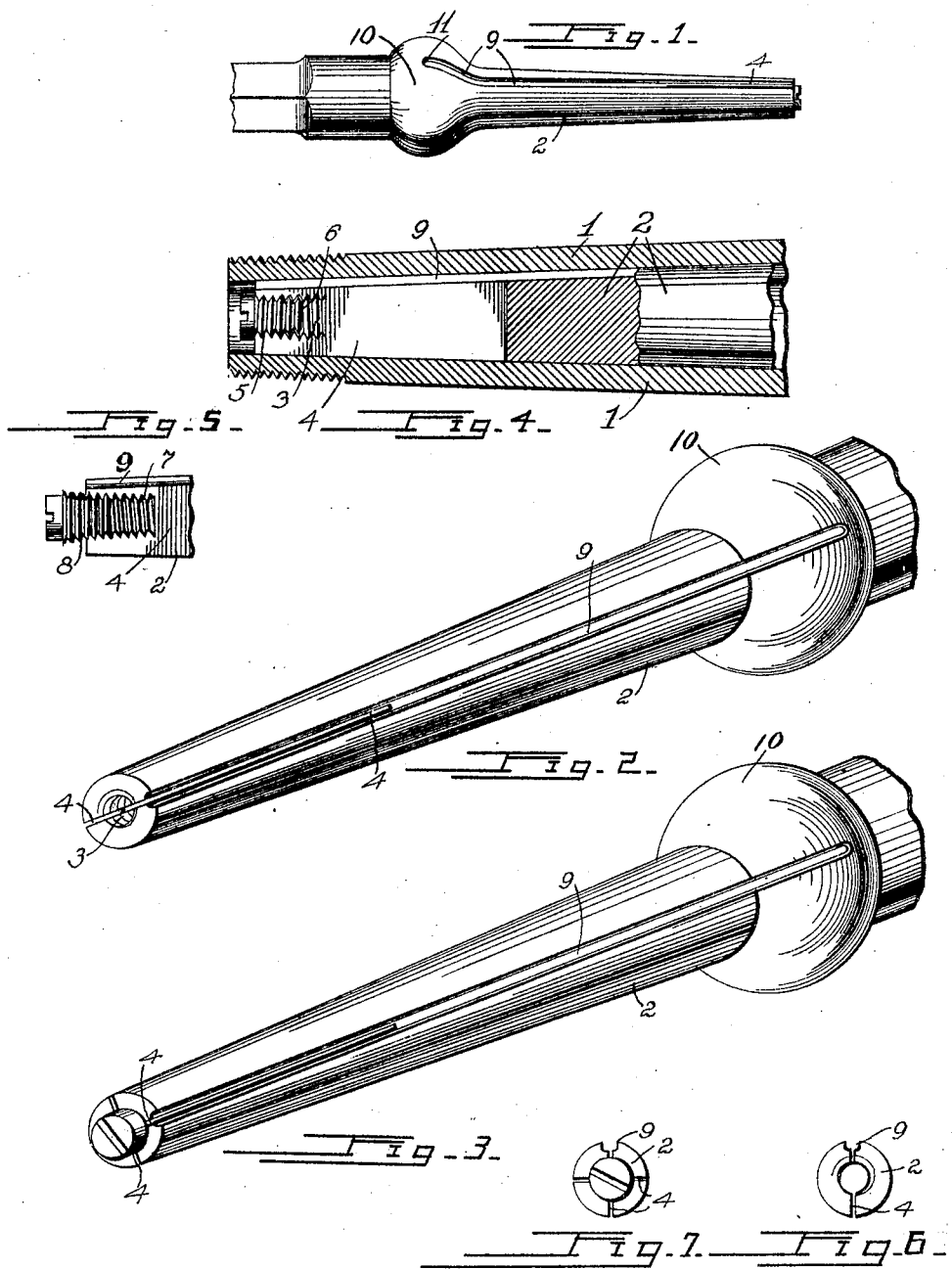

ALFRED H. WORREST, OF LANCASTER, PENNSYLVANIA.

SPINDLE FOR VEHICLES.

No. 798,476.  Specification of Letters Patent.  Patented Aug. 29, 1905.

Application filed May 25, 1903. Serial No. 158,568.

*To all whom it may concern:*

Be it known that I, ALFRED H. WORREST, a citizen of the United States, and a resident of Lancaster, in the county of Lancaster and State of Pennsylvania, (whose post-office address is Lancaster,) have invented certain Improvements in Spindles for Vehicles, of which the following is a specification.

This invention relates to improvements in the axle-spindles of vehicles; and the object of the improvements is to take up the wear of the contacting surfaces of the hub-box and the axle-spindle, whereby play of said box on the spindle is prevented and jarring and rattling of the spindle in the hub is avoided.

The invention consists in the construction and combination of the various parts, as hereinafter fully described and then pointed out in the claims.

In the accompanying drawings, which form a part of this specification, Figure 1 is a side view of an axle-spindle embodying the invention; Fig. 2, a perspective view of the spindle; Fig. 3, a similar perspective view of a modified construction of the spindle; Fig. 4, a longitudinal section of the front end of the axle-spindle and of the hub-box; Fig. 5, a similar section showing a modified construction of the expansion device; Fig. 6, an end view of the axle-spindle; and Fig. 7 an end view of the modified construction of the spindle, the expansion-screw being in place.

Similar numerals indicate like parts throughout the several views.

Referring to the details of the drawings, 1 indicates the hub-box, and 2 the axle-spindle. In the outer end of said spindle and extending centrally of the length thereof for a short distance inward is a threaded socket 3, and from said outer end the spindle has cut through it diametrically a kerf or narrow slot 4, extending back farther than socket 3, as shown in Figs. 1 and 4. The socket may be cylindrical in form throughout its length, as seen in Fig. 4, and engaging this socket is a screw-plug 5, tapering toward its axis from its head to the free end 6 thereof. This free end of the screw-plug is of the same diameter as socket 3; but the screw-plug increases in diameter toward its head. By this means the outer end of the spindle as far back as slot 4 extends may be expanded by driving the screw-plug into the socket.

In Figs. 3 and 7 is illustrated a modification in the construction of the axle-spindle wherein there are two kerfs or slots, and in Fig. 5 are shown a tapering socket 7 and a tapering screw-plug 8, whereby the same result is attained as by using the construction shown in Fig. 4.

On spindle 2 and near the inner end thereof is a convex boss 10, and the end 11 of oil-groove 9 is extended into said boss, as shown in Figs. 1, 2, and 3. The expansion of the outer end of spindle 2 by screwing the plug into the socket in said end also tends to force the wheel toward the inner end of the spindle, thus taking up the wear between hub-box 1 and convex boss 10.

I do not limit myself to the use of any particular number of kerfs or cuts in the spindle; neither do I restrict myself to the particular construction of the screw-plug therein shown and described.

Having thus described my invention, what I claim as new, and desire to secure by Letters Patent, is—

1. The combination of a spindle provided with a longitudinally-disposed socket in its outer end and having a longitudinal slot therein opening into the socket and extending from said outer end farther toward the butt of the spindle than does said socket, and an expansion-plug engaging the socket.

2. The combination of a spindle provided with a longitudinally-disposed tapering socket in its outer end and having a longitudinal slot therein opening into the socket and extending from said outer end farther toward the butt of the spindle than does said socket, and an expansion-plug engaging the socket.

3. The combination of a spindle provided with a longitudinally-disposed threaded socket in its outer end and having a longitudinal slot therein opening into the socket and extending from said outer end farther toward the butt of the spindle than does said socket, and an expansion screw-plug engaging the socket.

4. The combination of a spindle provided with a longitudinally-disposed socket threaded from its outer end inward and having a longitudinal slot therein opening into the socket and extending from said outer end farther toward the butt of the spindle than does said socket, and an expansion screw-plug engaging said socket.

5. The combination of a spindle provided with a longitudinally-disposed socket threaded from its outer end inward and having a plurality of longitudinal slots therein opening into the socket and extending from said outer end farther toward the butt of said spindle than does the socket, and an expansion screw-plug engaging the socket.

ALFRED H. WORREST.

Witnesses:
C. G. BASSLER,
WM. R. GERHART.